United States Patent
Beale et al.

(10) Patent No.: US 12,323,917 B2
(45) Date of Patent: Jun. 3, 2025

(54) COMMUNICATIONS DEVICES, INFRASTRUCTURE EQUIPMENT AND METHODS

(71) Applicant: Sony Group Corporation, Tokyo (JP)

(72) Inventors: Martin Warwick Beale, Basingstoke (GB); Shin Horng Wong, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 428 days.

(21) Appl. No.: 17/797,113

(22) PCT Filed: Mar. 24, 2021

(86) PCT No.: PCT/EP2021/057546
§ 371 (c)(1),
(2) Date: Aug. 3, 2022

(87) PCT Pub. No.: WO2021/197958
PCT Pub. Date: Oct. 7, 2021

(65) Prior Publication Data
US 2023/0023422 A1    Jan. 26, 2023

(30) Foreign Application Priority Data
Mar. 31, 2020 (EP) .................................. 20167430

(51) Int. Cl.
*H04W 52/02* (2009.01)
*H04W 24/10* (2009.01)
(52) U.S. Cl.
CPC ....... *H04W 52/0232* (2013.01); *H04W 24/10* (2013.01); *H04W 52/028* (2013.01)
(58) Field of Classification Search
CPC ........... H04W 52/0235; H04W 52/028; H04W 52/0248; H04W 52/44
See application file for complete search history.

(56) References Cited

U.S. PATENT DOCUMENTS

2021/0385008 A1* 12/2021 Hang .................... H04L 1/0038
2022/0116181 A1*  4/2022 Lin ..................... H04W 74/0808
2022/0416987 A1* 12/2022 Takeda ................... H04L 5/001

FOREIGN PATENT DOCUMENTS

WO    2020/037319 A1    2/2020

OTHER PUBLICATIONS

International Search Report and Written Opinion mailed on Jun. 17, 2021, received for PCT Application PCT/EP2021/057546, filed on Mar. 24, 2021, 11 pages.

(Continued)

*Primary Examiner* — Bo Hui A Zhu
(74) *Attorney, Agent, or Firm* — XSENSUS LLP

(57) ABSTRACT

A communications device is configured to receive in a wireless communications systems using discontinuous reception. The communications device is configured to receive by determining a valid number of search spaces from which a wake-up signal, WUS, can be validly received during a power saving monitoring period. The valid number of search spaces is one or more of a plurality of search spaces of a downlink physical control channel of a wireless access interface provided by a wireless communications network for a WUS. The power saving monitoring period can be monitored by a receiver of the communications device in a low power state, the WUS being decodable with more relaxed processing requirements, and the WUS indicating that the receiver of the communications device should be powered up to a higher power state to receive signals in a discontinuous receiving on, DRX_ON, period.

20 Claims, 10 Drawing Sheets

(56) References Cited

OTHER PUBLICATIONS

3GPP, "NR; Study on User Equipment (UE) power saving in NR (Release 16)", 3GPP TR 38.840 V16.0.0, Jun. 2019, pp. 1-74.
CATT et al., "Revised WID: UE Power Saving in NR", 3GPP TSG RAN Meetings #85, RP-192149, Sep. 16-20, 2019, 5 pages.
CATT, "Remaining issue on the Power Saving Signals/Channels", 3GPP TSG RAN WG1 Meeting #100, R1-2000537, Feb. 24-Mar. 6, 2020, 5 pages.
Holma et al., "LTE for UMTS OFDMA and SC-FDMA Based Radio Access", John Wiley & Sons, 2009, 232 pages.
Sierra Wireless, "Idle Mode Power Efficiency Reduction", 3GPP TSG RAN WG1 Meeting #89, R1-1708311, May 15-19, 2017, 6 pages.
Rapporteur (CATT), "RAN1 agreements on UE Power Saving in NR", 3GPP TSG RAN WG1 Meeting #99, R1-1913605, Nov. 18-22, 2019, 19 pages.
NTT Docomo Inc., "Revised WID on New Radio Access Technology", 3GPP TSG RAN Meeting #78, RP-172834, Dec. 18-21, 2017, 11 pages.
3GPP, "NR; Study on UE Power Saving (Release 16)", 3GPP TR 38.840 V0.1.0, Nov. 2018, pp. 1-24.

\* cited by examiner

COMMUNICATIONS DEVICES, INFRASTRUCTURE EQUIPMENT AND METHODS

CROSS-REFERENCE TO RELATED APPLICATIONS

The present application is based on PCT filing PCT/EP2021/057546, filed Mar. 24, 2021, which claims priority to EP 20167430.6, filed Mar. 31, 2020, the entire contents of each are incorporated herein by reference.

BACKGROUND

Field of Disclosure

The present disclosure relates generally to communications devices and methods of receiving by communications devices in accordance with discontinuous reception, which can provide power saving. The present disclosure also relates generally to infrastructure equipment forming part of a wireless communications network and methods of operating infrastructure equipment.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support a wide range of devices associated with different applications and different characteristic data traffic profiles.

One of the challenges for implementing communications devices is to reduce power consumption. One technique for reducing power consumption is to use discontinuous reception in which a communications device reduces power to its receiver for a period during which the communications device knows that a wireless communications network will not be transmitting to that communications device.

Providing techniques which can improve wireless communications in combination with power saving can present technical challenges.

SUMMARY OF THE DISCLOSURE

The present disclosure can help address or mitigate at least some of the issues discussed above.

Embodiments of the present technique can provide a method of receiving at a communications device comprising determining a valid number of search spaces from which a wake-up signal, WUS, can be validly received during a power saving monitoring period, the valid number of search spaces being one or more of a plurality of search spaces of a downlink physical control channel of a wireless access interface provided by a wireless communications network for a WUS. The power saving monitoring period can be monitored by a receiver of the communications device in a low power state, for example the WUS can be decodable with relaxed processing requirements, and the WUS indicating that the receiver of the communications device should be powered up to a higher power state to receive signals in a discontinuous receiving on, DRX_ON, period. In other examples, WUS indicates that the communications device should go to sleep or power down its receiver during the DRX_ON period. If the number of valid search spaces is less than a minimum number, $N_{mon}$, of valid search spaces, the method comprises identifying one or more search spaces which are invalid, and determining that one or more of the invalid search spaces can be regarded as valid, and monitoring the valid search spaces, and the search spaces which are regarded as valid for the WUS.

Embodiments can provide a flexible technique for more prioritising reception of a WUS over other operations which would otherwise invalidate a search space. Accordingly a communications device and correspondingly an infrastructure equipment can apply predetermined rules to identify some search spaces which are invalid to be regarded as valid, if the number of otherwise valid search spaces is below a pre-agreed minimum number ($N_{mon}$) The minimum number of valid search spaces may be signalled by the infrastructure to the communications device before a DRX cycle begins.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
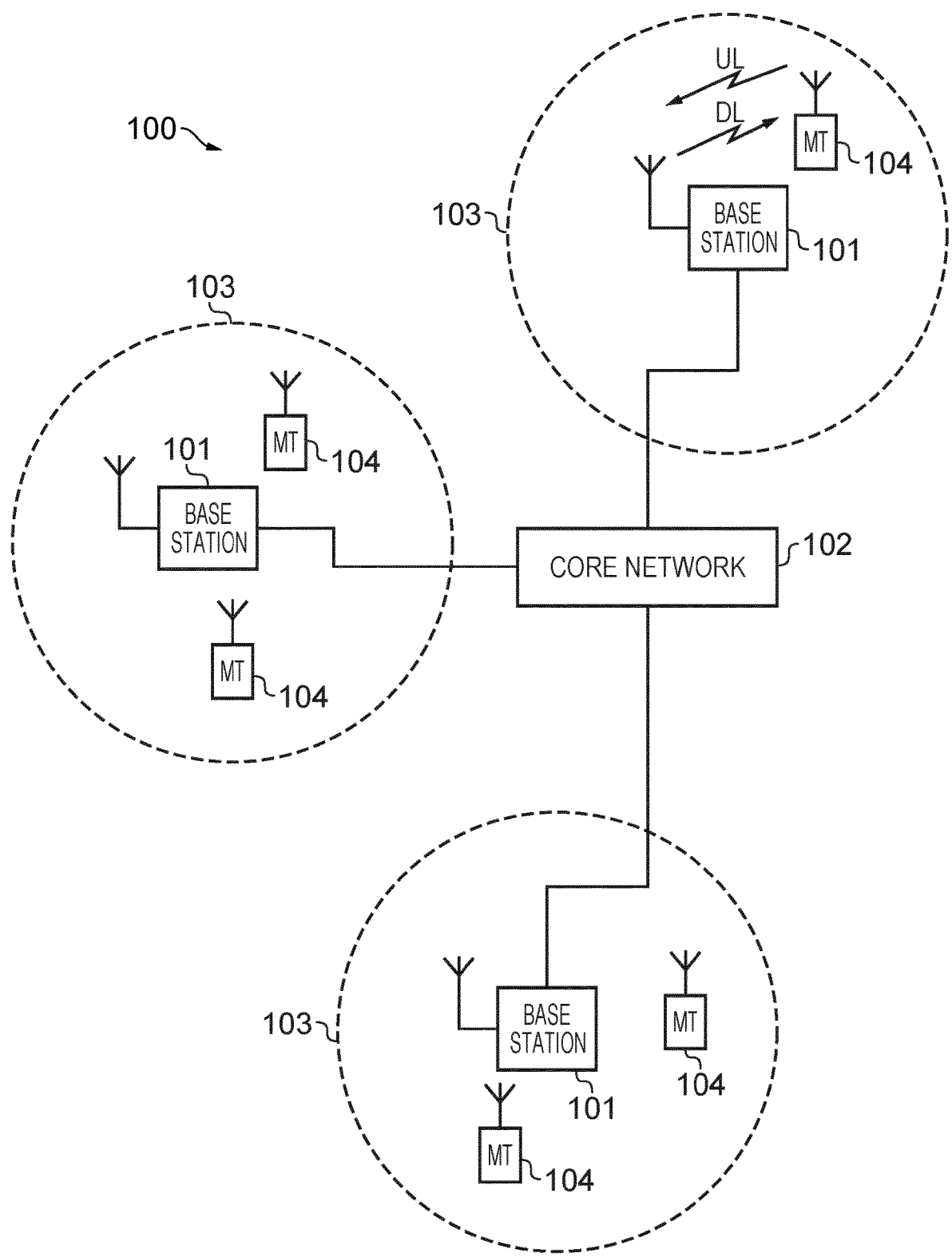
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
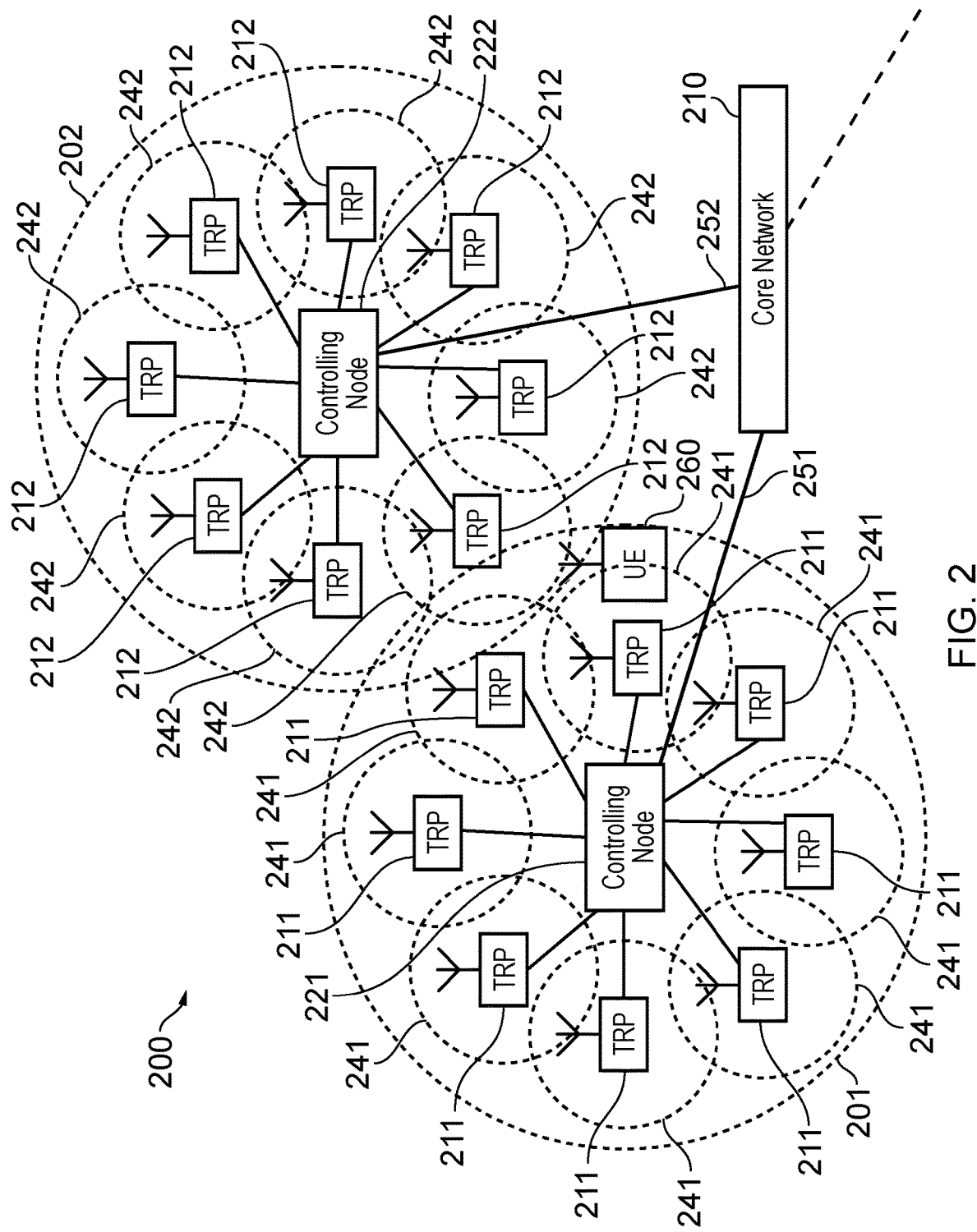
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated that in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
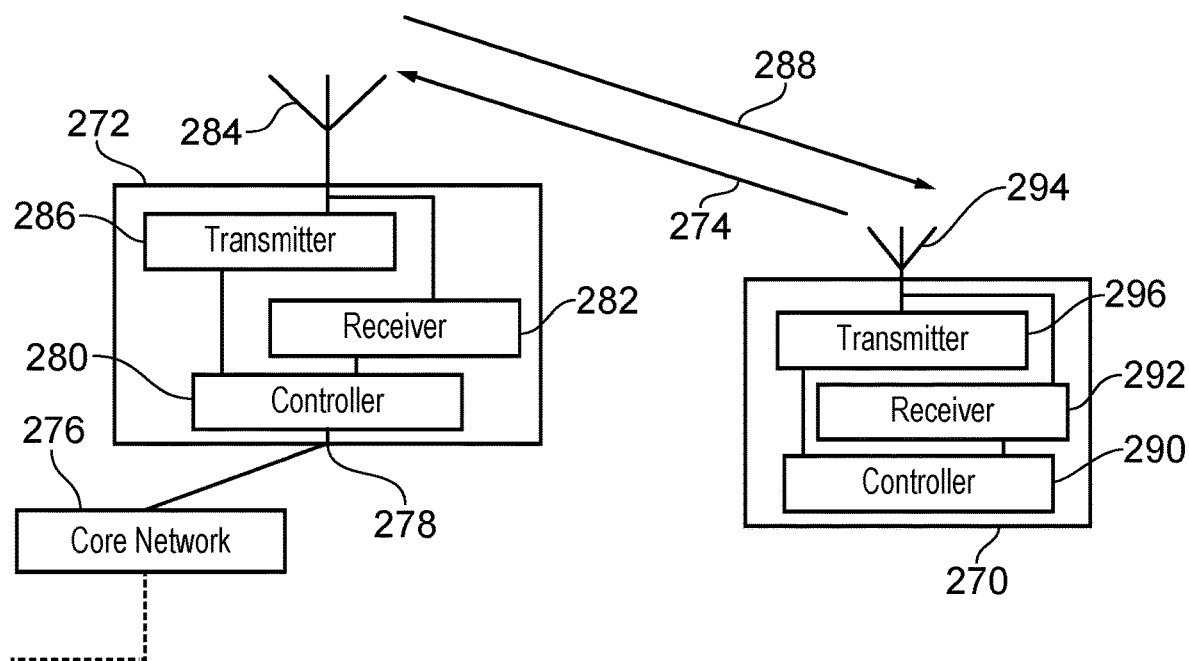
FIG. 3 is a schematic block diagram of an example infrastructure equipment and communications device which may be configured to operate in accordance with certain embodiments of the present disclosure.

A more detailed illustration of a UE/communications device 270 (which may correspond to a communications device such as the communications device 260 of FIG. 2 or the communications device 104 of FIG. 1) and an example network infrastructure equipment 272, which may be thought of as an eNB 101 or a combination of a controlling node 221 and TRP 211, is presented in FIG. 3.

As shown in FIG. 3, the communications device 270 is shown to transmit uplink data to the infrastructure equipment 272 via uplink resources of a wireless access interface as illustrated generally by an arrow 274 from the communications device 270 to the infrastructure equipment 272. The communications device 270 may similarly be configured to receive downlink data transmitted by the infrastructure equipment 272 via downlink resources as indicated by an arrow 288 from the infrastructure equipment 272 to the communications device 270. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, each communications device 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of each communications device 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/ chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Power Saving and Discontinuous Reception (DRX) in NR

In a typical currently deployed network, communications devices can operate in a discontinuous reception (DRX) mode during which the communications devices wake-up (power-up their receivers) to receive signals for their DRX wake time. This can occur when the communications devices are in an idle mode or in a connected mode. In connected mode, the terminal device is configured to periodically monitor PDCCH in groups of slots or subframes. If a PDCCH is not detected during the group of slots or subframes, the terminal device may sleep for the next cycle of the periodicity. Power saving is an important aspect of a user's experience of NR, which will influence the adoption of 5G handsets and/or services. DRX is one method of power saving for NR terminal devices.

Figure 4:
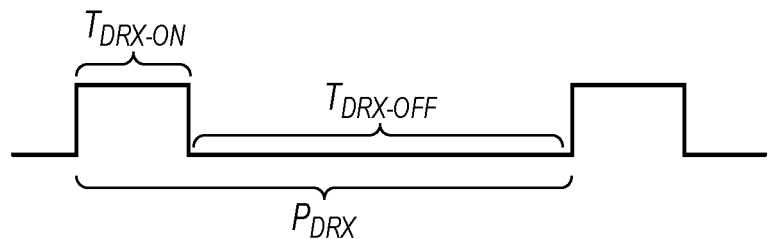
FIG. 4 is a graphical plot of UE processing activity against time illustrating an example of a discontinuous reception (DRX) cycle.

The basic DRX cycle is shown in FIG. 4, which consists of a DRX ON period of duration T DRX ON and a period of inactivity, i.e. a DRX OFF period, of duration $T_{DRX-OFF}$ where the DRX ON period occurs periodically at a DRX period, $P_{DRX}$. During the DRX ON period, the UE switches on its receiver to monitor for downlink traffic and switches off its receiver during the DRX OFF period to save power consumption. The DRX parameters $T_{DRX\_ON}$ & $P_{DRX}$ are configured by the network. It should be appreciated by those skilled in the art that such a basic operation may not always be efficient, particularly if a UE frequently does not receive any signals during the ON period (or active operating mode) of the DRX operation.

Wake-Up Signals to Save Power

There are a number of different ways in which the battery life of a UE may be improved. One such way is by enabling a DRX configuration to adapt to a UE's expected data reception or transmission profile. For example, a Wake Up Signal (WUS) may be used to indicate whether a UE should wake up during a DRX ON period. The WUS is a signal or a channel that is transmitted to a UE or a group of UEs prior to a DRX ON period or Paging Occasion to indicate whether the UE(s) needs to wake up during this ON period and monitor for possible traffic, e.g. monitor the PDCCH. Using a WUS signal in this way to wake-up a UE recognizes that not every DRX ON period contains traffic for the UE, and for such a case, the PDCCH monitoring consumes unnecessary power from the UE, which can be avoided with this WUS signaling.

Wake-up signals are supported in technologies such as eMTC, NB-IoT and in 5G NR. The eMTC/NB-IoT wake-up signal (WUS) is used in IDLE mode before a paging occasion. If the UE detects a WUS, it wakes up and monitors the following paging occasion for an MPDCCH/NPDCCH that may further allocate a paging message. If the UE does not receive a WUS, it can go back to sleep. The WUS consists of a known sequence. The UE can monitor for the WUS by performing a correlation against this known sequence. As indicated above, the WUS can either be common to all the UEs associated with the paging occasion or associated with a group of UEs that are associated with the paging occasion. An example of a WUS is illustrated by a timing diagram showing a plot of transmission power and UE receiver activity with respect to time 500 provided in FIG. 5.

Figure 5:
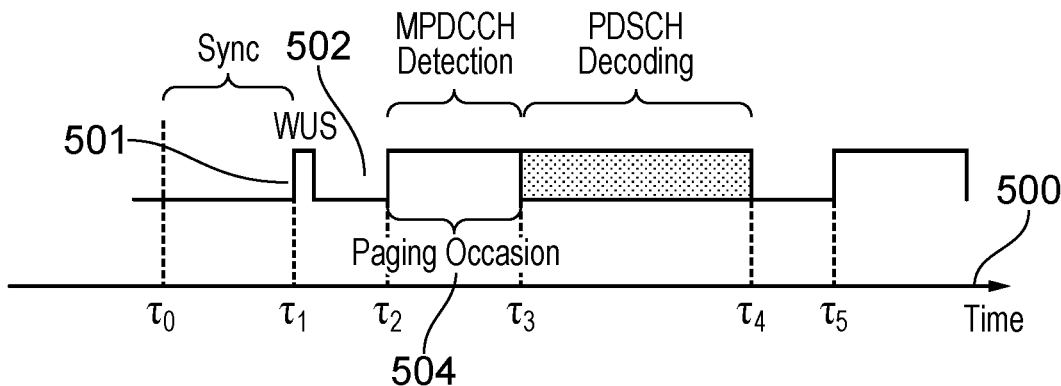
FIG. 5 is a graphical plot of UE processing activity against time illustrating an example of a paging occasion preceded by a wake-up signal according to that used for LTE.

As shown in FIG. 5, a wake-up signal WUS 501 occurs at a known time offset τ2-τ1 502 before a paging occasion 504. The time offset 502 allows the UE to "boot-up" its main receiver after WUS reception and before the paging occasion 504. As a result the WUS itself can be monitored with a lower power receiver. The WUS is transmitted prior to the paging occasion 504 as shown in FIG. 5 at time $\tau_1$, only when there is an MPDCCH transmission in that paging occasion. Upon detection of a WUS, the UE will proceed to fine tune its frequency and timing tracking loops if required and blind detects for an MPDCCH between time $\tau_2$ and $\tau_3$ followed by decoding of the PDSCH carrying the paging message between time $\tau_3$ and $\tau_4$. If the UE fails to detect a WUS, it will go back to sleep and skip detecting for MPDDCH. Hence by using WUS, the UE will consume less energy by avoiding unnecessary monitoring of MPDCCH. It should be appreciated that WUS can also be used in connected mode when DRX is used.

In some examples, the WUS may be a physical channel containing very little information (e.g. UE ID) and so the UE can decode the WUS very quickly compared with blind decoding for MPDCCH. The WUS can also be encoded with a format that enables low power decoding, for example the WUS may be a narrow bandwidth signal that can be decoded with low power using a low sampling rate receiver.

Figure 6:
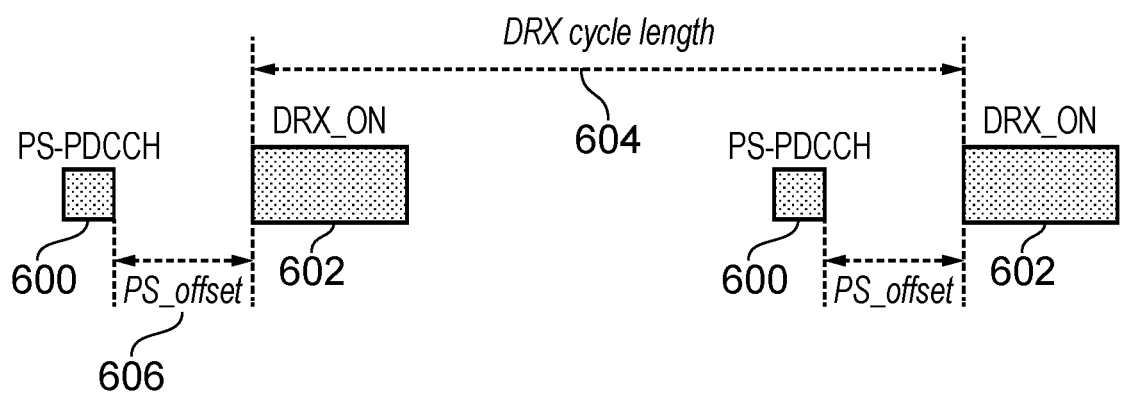
FIG. 6 is a graphical plot of UE processing activity against time illustrating an example of a discontinuous reception (DRX) cycle according to that used for 5G/NR.

For the example of 5G NR, a wake-up signal WUS is used in CONNECTED mode DRX operation [1]. The 5G NR WUS is based on a PDCCH (Physical Downlink Control Channel) that carries a DCI (Downlink Control Information). The PDCCH is termed a "Power saving-PDCCH", PS-PDCCH. This monitoring period is referred to as a "PS-PDCCH monitoring period", where the term "PS-PDCCH" is synonymous with "PDCCH that is scrambled with a PS-RNTI". This monitoring period may also be referred to as a "power saving monitoring period". The NR WUS is described in more detail in TR38.840 [2]. Agreements related to the NR WUS are listed in [3]. An example timing diagram illustrating a transmission of signals with respect to time for a 5G NR operation in a CONNECTED mode is shown in FIG. 6. As shown in FIG. 6, a PS-PDCCH 600 occurs in a search space before a DRX_ON phase 602 of a DRX cycle represented by a double headed arrow 604. This example represents one full CONNECTED mode DRX cycle. A temporal location of the PS-PDCCH 600 is in advance of the DRX_ON phase 602 by an amount PS_offset 606. A UE decodes the DCI within the PS-PDCCH. Since the UE only has to decode the PS-PDCCH, it does not have to operate its full receiver circuitry, hence PS-PDCCH can be decoded with a lower receive power. If the DCI indicates that the UE should wake up, the UE wakes up its full receiver circuitry for the next DRX_ON duration. Otherwise the UE can go to sleep following the PS-PDCCH and does not have to decode other PDCCH during the DRX_ON duration.

It has been proposed that the DCI carried by the PS-PDCCH can instruct the UE to perform other functions within the DRX_ON phase, such as to send a CSI report (channel state information report), send SRS (sounding reference signals), to change DRX parameters etc.

In some examples extra reference symbols may be transmitted either before the PS-PDCCH 600 or after the PS-PDCCH 600:

If before the PS-PDCCH 600, then reference symbols would allow a UE to establish synchronisation with the gNodeB more quickly and hence to wake up from a low power state more quickly;

If after the PS-PDCCH 600 then reference symbols transmitted after the PS-PDCCH 600 and before the DRX_ON period 602 would allow the UE to wake up its main receiver more quickly at the start of the DRX_ON period if the DCI carried by the PS-PDCCH had indicated to the UE that it needed to wake up.

Adaptation of WUS Procedure for Invalid Search Spaces

During DRX operation, the UE has to wake up at a DRX_ON period in order to monitor for PDCCH that schedules DL or UL data. With the WUS functionality, the WUS controls whether the UE actually has to wake up during this DRX_ON period or not. If there is data for the UE, the WUS indicates that the UE must wake up during the DRX_ON period. If there is no data for the UE, the WUS indicates that the UE may go to sleep during the DRX_ON period.

The NR 5G WUS takes the form of downlink control information, using a new DCI format (DCI format 2_6) that is transmitted within a PDCCH that is scrambled with a PS-RNTI. A UE that is configured to monitor DCI format 2_6 monitors PDCCH during a monitoring period before the DRX_ON duration, as shown in FIG. 7.

Figure 7:
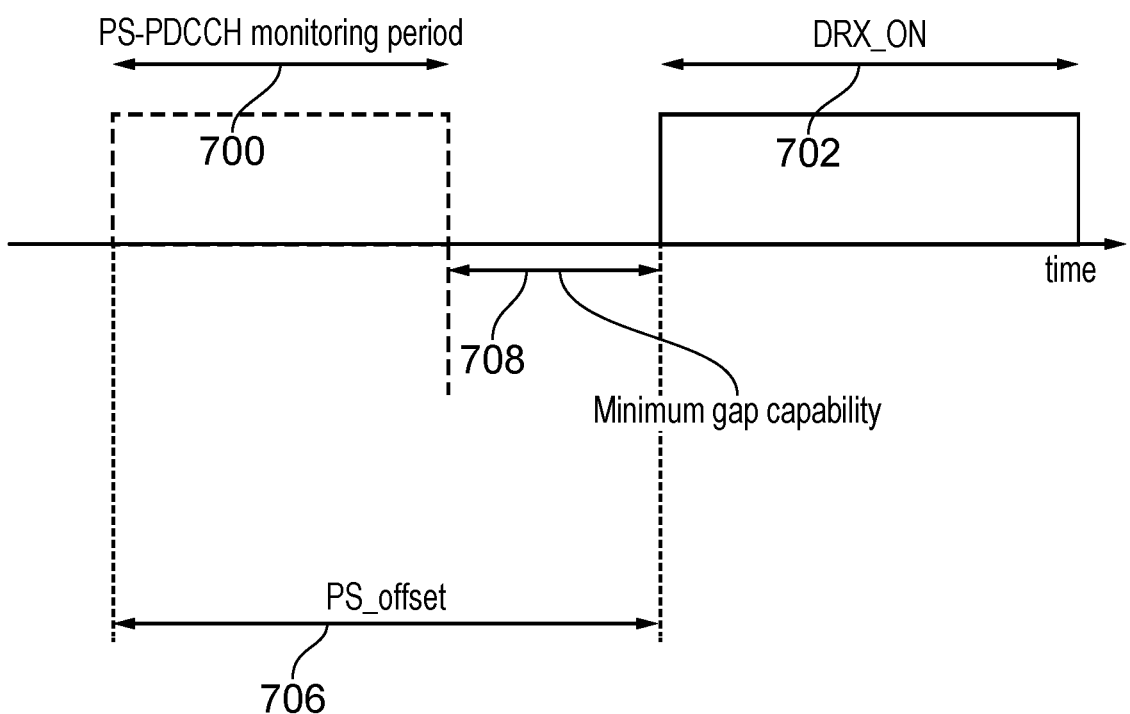
FIG. 7 is a graphical plot of UE processing activity against time illustrating an example of a monitoring period for DCI format 2_6.

As illustrated by an example of one PS-PDCCH monitoring period and one DRX_ON period shown in FIG. 7, a monitoring period for PS-PDCCH 700 can start at a time PS_offset 706 before the DRX_ON duration 702, where PS_offset 706 is signaled to the UE via RRC signalling. The monitoring period ends at a minimum gap 708 capability before the DRX_ON duration. The minimum gap capability 708 allows time for the UE to turn on its main receiver after it has completed PS-PDCCH decoding using a lower power WUS receiver (the WUS receiver could operate at a lower power by operating with a reduced voltage, reduced clock frequency, reduced number of CPU cores or by other implementation means).

Figure 8:
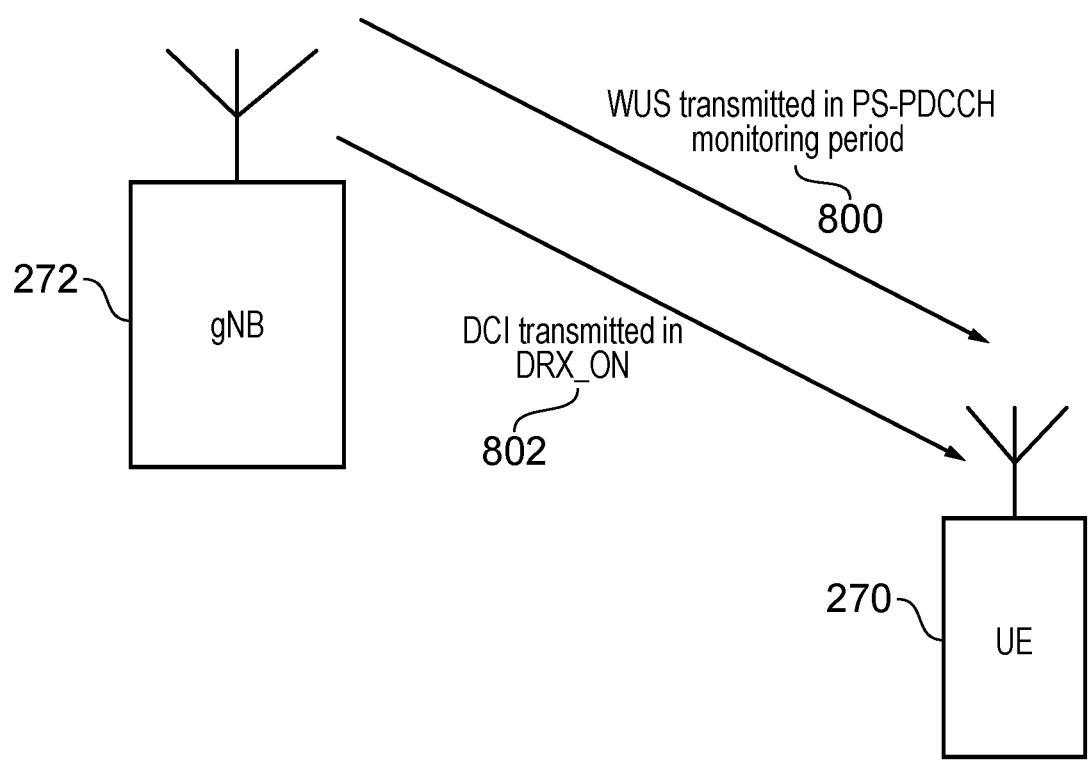
FIG. 8 schematically represents a gNB transmitting a WUS signal and a DCI to a UE according to example embodiments.

Therefore as shown in FIG. 8, a gNB and a UE (such as gNB 272 and UE 270 respectively of FIG. 3) are configured to operate in a first PS-PDCCH monitoring period 700 so that the gNB can transmit a WUS 800 in a search space of the UE 270 (explained below) whilst a receiver 292 and a controller 290 of the UE 270 are in a lower power state. In a second DRX_ON period 702, the gNB 272 then transmits a DCI 802 whilst the UE 270 has powered up its receiver 292 to operate in a mode in which it can receive the DCI transmitted by the gNB 272.

The UE is configured to monitor various sets of search spaces in normal operation. These search spaces occur periodically. The UE monitors for DCI format 2_6 (potentially carrying WUS) when these search spaces overlap with the PS-PDCCH monitoring period. Since the periodicity of the PS-PDCCH monitoring period (related to the DRX_ON periodicity) can be different to the periodicity of the search spaces and since there are configurations where the PS-PDCCH monitoring period and the search space periodicity are not common multiples, the number of search spaces in which the UE monitors for DCI format 2_6 depends on the alignment of the search space periodicity with the PS-PDCCH monitoring period. Hence during some PS-PDCCH monitoring periods the UE monitors X search spaces and in other PS-PDCCH monitoring periods the UE monitor Y search spaces.

Figure 9:
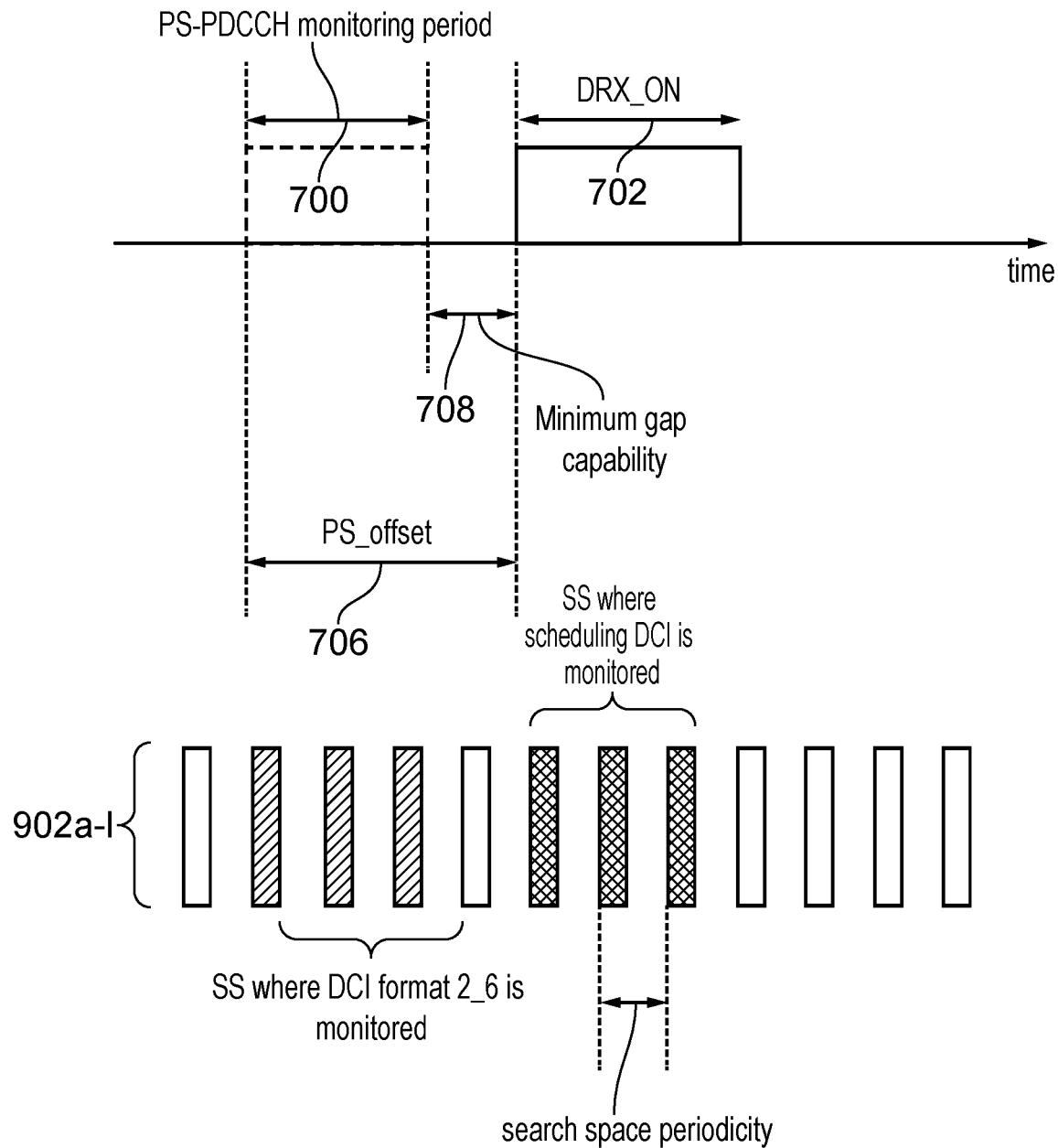
FIG. 9 is a graphical plot of UE processing activity against time illustrating an example of periodic search spaces used by the UE for monitoring for DCI format 2_6.

As an illustrative example, FIG. 9 shows how a UE, such as UE 270, may determine when to monitor for DCI format 2_6 (potentially containing WUS) and when to monitor for scheduling DCI. FIG. 9 shows a possible alignment between a periodic set of 12 search spaces 902a-1 with the PS-PDCCH monitoring period 600 and the DRX_ON period 602. The search spaces 902a-1 are monitored by the UE 270. A first sub-set 902b-d of the periodic set of search spaces 902a-1 are represented by a diagonal hatching pattern and a second sub-set 902f-h of the periodic set of search spaces 902a-1 are represented by a cross hatching pattern as shown in FIG. 9. The first sub-set 902b-d overlap in time with the PS-PDCCH monitoring period 600 and are used by UE 270 to monitor for DCI format 2_6. In other words, the UE 270 uses the first sub-set 902b-d to monitor for WUS. The second sub-set 902f-h overlap in time with the DRX_ON period 602 and are used by the UE 270 to monitor for scheduling DCI. In the example of FIG. 9, the UE 270 monitors three search spaces during the PS-PDCCH monitoring period 600 (i.e. the first sub-set 902b-d) for DCI format 2_6. However, as explained above, the number of search spaces in which the UE monitors for DCI format 2_6 depends on the alignment of the set of search spaces 902a-1 with the PS-PDCCH monitoring period 600. Therefore the UE 270 may monitor a different number of search spaces during different PS-PDCCH monitoring periods. In some embodiments, the UE 270 may determine that one or more of the search spaces 902a-1 are invalid. If a search space is determined to be invalid by the UE 270 then the UE may not monitor for DCI format 2-6 during the invalid search space.

In some embodiments, a measurement gap coincides with a search space to be monitored by the UE 270. In this embodiment, the UE 270 may determine that the search space is invalid and perform inter-frequency measurements. Performing inter-frequency measurements may mean that the UE is unable to monitor PS-PDCCH during a contemporaneous search space.

In some embodiments, the UE 270 may be configured to monitor beam quality. If a quality of a beam is determined to be insufficient by the UE 270, then the UE 270 may need to perform a procedure to report a beam failure. For example, the UE 270 may report the beam failure to a gNB to which the UE 270 is connected by the beam. The reporting of the beam failure may overlap in time with a search space during which the UE 270 was to monitor for DCI format 2_6 (such as one of the first sub-set of search spaces 902b-d in FIG. 9). The UE 270 may report the beam failure and the search space which overlaps in time with the reporting of the beam failure may cause the contemporaneous search space that was to be used for PS-PDCCH monitoring to be determined to be invalid by the UE 270.

In some embodiments, the UE 270 may perform a bandwidth part (BWP) switch which overlaps in time with a search space during which the UE 270 was to monitor for DCI format 2_6 (such as one of the first sub-set of search spaces 902b-d in FIG. 9). The UE 270 may perform the BWP switch and the search space which overlaps in time with the bandwidth part switch (BWP) may be determined to be invalid by the UE 270.

There may be a set of PDCCH candidates within a search space. A set of PDCCH candidates may be a set of Control Channel Elements (CCE) to which the PDCCH is mapped. A UE may attempt to decode the PDCCH using the set of PDCCH candidates within the search space. In order to decode the PDCCH using one of the set of PDCCHS candidates, the UE assembles a set of physical bits associated with that candidate and attempts to decode the PDCCH using parameters of that candidate. Parameters of a PDCCH candidate may include, but are not limited to, a number of DCI bits associated with the candidate or an aggregation level associated with the candidate. The UE may determine that one or more of the PDCCH candidates within the search space are invalid. The UE may determine that a PDCCH candidate is invalid if it is not possible to decode the PDCCH candidate. Examples of reasons for a PDCCH being impossible to decode by the UE are as follows:

- A PDCCH candidate in a search space overlaps in time with an SSB (synchronization signal block). The PDCCH candidate may not be able to be decoded because an amount of the PDCCH candidate's physical resources overlapping in time with resources used for the SSB may exceed a threshold.
- A PDCCH candidate overlaps in time with reserved resources. 5G NR resources can be reserved for use by other technologies. For example, when a 5G NR spectrum overlaps with an LTE spectrum, the resources that are used for CRS (cell specific reference signals) in the LTE spectrum are reserved in the 5G NR spectrum (for example, subcarriers and OFDM symbols may contain LTE CRS rather than 5G signals). The PDCCH candidate may not be able to be decoded because an amount of the PDCCH candidate's physical resources overlapping in time with the reserved resources may exceed a threshold.

A UE, such as UE 270, may decide to whether or not to wake up to decode DRX_ON based on a WUS signaled via DCI format 2_6 during the PS-PDCCH monitoring period. However, 3GPP have considered that the UE should take into account the number of search spaces which have been declared as invalid within the PS-DCCH monitoring period when determining whether to wake up to decode DRX_ON. In particular, if one or more search spaces or PDCCH candidates within a search space which overlap with a PS-PDCCH monitoring period are determined to be invalid, the UE 270 may be configured to wake up for a subsequent DRX_ON duration. The advantage of this approach is that if a gNodeB had initially allocated/scheduled the invalid search space or invalid PDCCH candidate in order to signal WUS to the UE 270, the gNodeB would not have to re-allocate/re-schedule the WUS to occupy another search space or PDDCH candidate that was valid, in the knowledge that the UE would wake up in any case. By avoiding the re-allocation/re-scheduling, gNodeB implementation may be simplified. Alternatively, if all of the search spaces and/or all of the PDCCH candidates within the search spaces overlapping with the PS_PDCCH monitoring period are determined to be invalid, then the UE 270 may be configured to wake up during a subsequent DRX_ON period. The rationale behind this approach is that if none of the search spaces/PDCCH candidates during a PS-PDCCH monitoring period are determined to be valid, then the gNodeB is unable to signal a WUS to the UE and hence cannot signal to the UE to wake up during the DRX_ON period. In this case, the UE should wake up, in the absence of a WUS signal, in case data would be scheduled to it during the DRX_ON period.

Figure 10:
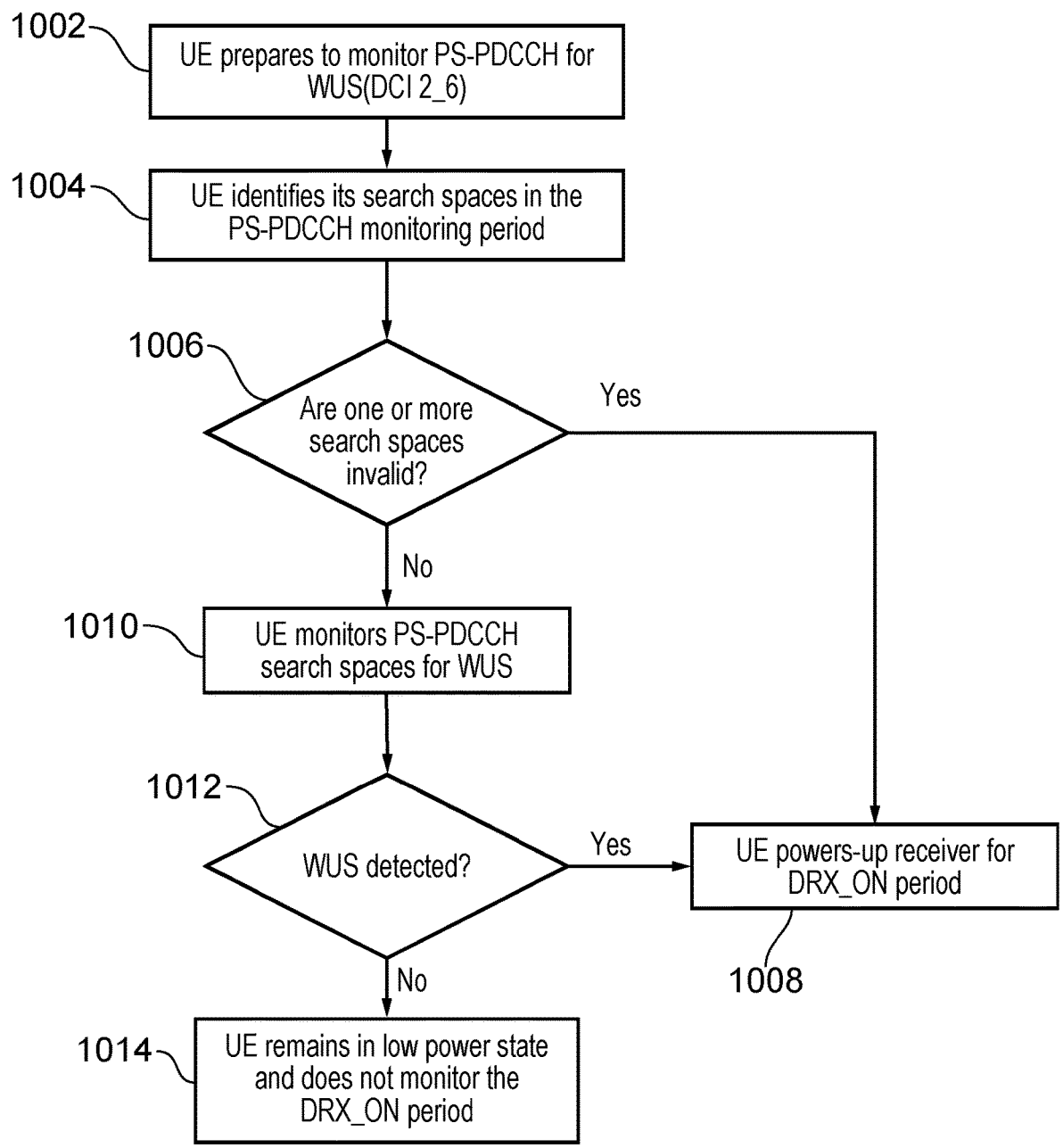
FIG. 10 is a flow diagram illustrating processes performed by a UE to determine whether to wake-up during a DRX_ON period.

FIG. 10 illustrates an example of a processing procedure for determining whether a UE, such as UE 270, should wake up during a DRX_ON period (such as DRX_ON period 602). In step 1002, the UE 270 prepares to monitor a PS-PDCCH monitoring period (such as PDCCH monitoring period 600) for DCI format 2_6 containing a WUS. In step 1004, the UE identifies search spaces which overlap in time with the PDCCH monitoring period 600 (such as first-sub set 902b-d). In step 1006, the UE 270 determines if one or more of the search spaces of the first sub-set 902b-d are invalid. If it is determined that one or more of the search spaces of the first sub-set 902b-d are invalid then the UE 270 wakes up during the DRX_ON period as indicated in step 1008. If it is determined that one or more of the search spaces of the first sub-set 902b-d are not invalid then the UE 270 monitors the first sub-set 902b-d of search spaces during the PS-PDCCH monitoring period 600 for DCI format 2_6 containing a WUS in step 1010. In step 1012, the UE 270 determines whether or not a WUS has been detected in the first sub-set 902b-d. If a WUS has been detected in the first sub-set 902b-d, then the UE 270 wakes up in step 1008. If a WUS has not been detected in the first sub-set, then the UE remains in a low power state and does not monitor the DRX_ON period 602.

The approaches explained above are restrictive and there is a need for a more flexible approach to determining whether invalid search spaces/PDCCH candidates within a PS-PDCCH monitoring period require the UE to wake up in the subsequent DRX_ON duration or not.

In some embodiments, a UE (such as UE 270), monitors at least $N_{mon}$ of a set of search spaces/PDCCH candidates overlapping in time with a PS-PDCCH monitoring period 600 (such as monitoring $N_{mon}$ of the first-set of search spaces 902b-d in FIG. 9). In a case in which one or more of the first sub-set of search spaces overlapping in time with the PS_PDCCH monitoring period 902b-d are determined to be invalid, then the UE: determines a valid number of search spaces from which a wake-up signal can be validly received during the power saving monitoring period, and if the number of valid search spaces is less than a minimum number ($N_{mon}$) of valid search spaces, the UE determines that one or more of the invalid search spaces can be regarded as valid, and the UE monitors the valid search spaces, and the search spaces which are regarded as valid for the WUS.

Determining $N_{mon}$

In some embodiments, a gNB may signal the minimum number of valid search spaces $N_{mon}$ to the UE 270.

In some embodiments, a gNB signals a percentage of search spaces/PDCCH candidates that should be monitored. The UE may then determine $N_{mon}$ by, for each PS-PDCCH monitoring period, calculating $N_{mon}$ by multiplying the percentage received from the gNB by the number of search spaces overlapping in time within the PS-PDCCH monitoring period. Alternatively, $N_{mon}$ may be calculated by determining a minimum number of search spaces overlapping in time with the PS-PDCCH monitoring period and multiplying the received percentage by the minimum number of search spaces overlapping with the PS-PDCCH. In this context, a minimum number of search spaces overlapping in time with the PS-PDCCH monitoring period is regarded as a number of search spaces overlapping in time with the PS-PDCCH ignoring that some of the search spaces overlapping with the PS-PDCCH may have been determined to be invalid for any of the reasons outlined above.

Determining which $N_{mon}$ Search Spaces to Monitor

In some embodiments, a UE or gNB may validate one or more invalid search spaces in order to increase a number of valid search spaces (in other words, a number of valid search spaces is refined to produce a refined number of valid search spaces). In order to determine which of the invalid search spaces are to be prioritised to be validated, the UE or gNB may apply a set of priority rules as explained below. Invalid search spaces with a higher priority are preferably chosen by the UE to be validated over invalid search spaces with a lower priority.

In some embodiments, a time occupied by search spaces overlaps with a time occupied by a measurement gap. In this embodiment, the search spaces overlapping in time with the measurement gap may be given a high priority to be validated. In other words, functions which were intended to be performed during the measurement gap, such as measuring downlink signals for reporting may be given a low priority. For example, if one or more search spaces are invalid due to overlap with a measurement gap then these search spaces may be validated to increase a number of valid search spaces. This has the advantage that measurements intended to be performed during the measurement gap can be deferred to a time when the measurements gaps do not overlap with PS-PDCCH search spaces or not performed.

In some embodiments, a time occupied by search spaces overlaps in time with a measurement gap and a bandwidth part (BWP) switch operation. In this embodiment, the search spaces overlapping in time with the measurement gap may be prioritised to be validated over the search spaces overlapping in time with the BWP switch operation. That is to say that the BWP switching operations are prioritised to be preserved over the measurement gaps. For example, if one or more search spaces are invalid due to overlap with a measurement gap and if one or more search spaces are invalid due to overlap with a BWP switch, then only the one or more search spaces overlapping with the measurement gap are validated. The advantage of this is that measurements can be deferred to a later time, but some BWP switching operations are commanded by the gNB and the UE is required to follow such decisions made by the gNB.

In some embodiments, a time occupied by search spaces overlaps in time with a BWP switch occurring due to expiry of an inactivity timer and another time occupied by search spaces overlaps in time with a BWP switch commanded by a gNodeB. In this embodiment, the search spaces overlapping with the BWP switch occurring due to expiry of the inactivity timer are prioritised to be validated over search spaces overlapping with the BWP switch commanded by the gNodeB. A UE can switch from an active BWP to a default BWP after a period of inactivity on the active BWP. Alternatively, the gNodeB may issue a command for the UE to switch from one BWP to another BWP. In this example, when the UE needs to validate a search space for PS-PDCCH monitoring, the UE prioritises choosing a search space overlapping with a BWP switch occurring due to expiry of an inactivity timer over a search space overlapping with a BWP switch commanded by the gNodeB. The rationale for this prioritisation is that the BWP switch related to inactivity can be deferred to a later time, after the PS-PDCCH monitoring period, whereas the BWP switch commanded by the gNodeB should be adhered to. In some embodiments, validating one or more invalid search spaces may result in a number of valid search spaces greater than $N_{mon}$. For example, if one PS-PDCCH search space is valid and 2 PS-PDCCH search spaces are invalidated due to collisions with measurement gaps, then validating all of the search spaces invalidated by collision with a measurement gap would lead to 3 validated search spaces. If $N_{mon}=2$, for example, then a refined number of valid search spaces is greater than $N_{mon}$. In some embodiments, the UE/gNB monitors the refined number of valid search spaces even if the number of valid search spaces is greater than $N_{mon}$. This may decrease an ambiguity about which search spaces a UE may need to monitor. In some embodiments the UE/gNB may implement further priority rules (outlined below) to ensure that the refined number of valid search spaces does not exceed $N_{mon}$.

In some embodiments, the UE/gNB validates search spaces which are furthest apart in time to improve scheduling flexibility. In some embodiments, the UE/gNB validates search spaces which are closest in time to reduce power consumption. For example, the power may be reduced because the UE may only need to activate its receiver for a shorter period of time. In some embodiments, the UE/gNB validates search spaces which occur earlier in the PS-PDCCH monitoring period. In some embodiments, the UE/gNB validates search spaces which occur later in the PS-PDCCH monitoring period.

One or more of the priority rules may indicate that other (non-WUS) functionality takes precedence over WUS functionality. In this embodiment, although $N_{mon}$ search spaces may have been valid, fewer than $N_{mon}$ search spaces may be monitored during a PS-PDCCH monitoring period. In this embodiment, the number of valid of search spaces is still increased compared to a case in which the priority rules were not applied.

In some embodiments, if fewer than $N_{mon}$ search spaces are valid, the UE monitors the DRX ON period regardless of whether it detects a WUS or not in valid search spaces. However the UE operates in a low power state (such as a sleep state) during the DRX_ON duration if one of the search spaces had contained a DCI format 2_6 indicating that the UE could go to sleep (GTS).

In some embodiments, one or more invalid search spaces may contain PDCCH candidates that are invalid. In such cases, those one or more invalid search spaces with a largest number of valid candidates are prioritized for conversion to validated search spaces.

Figure 11:
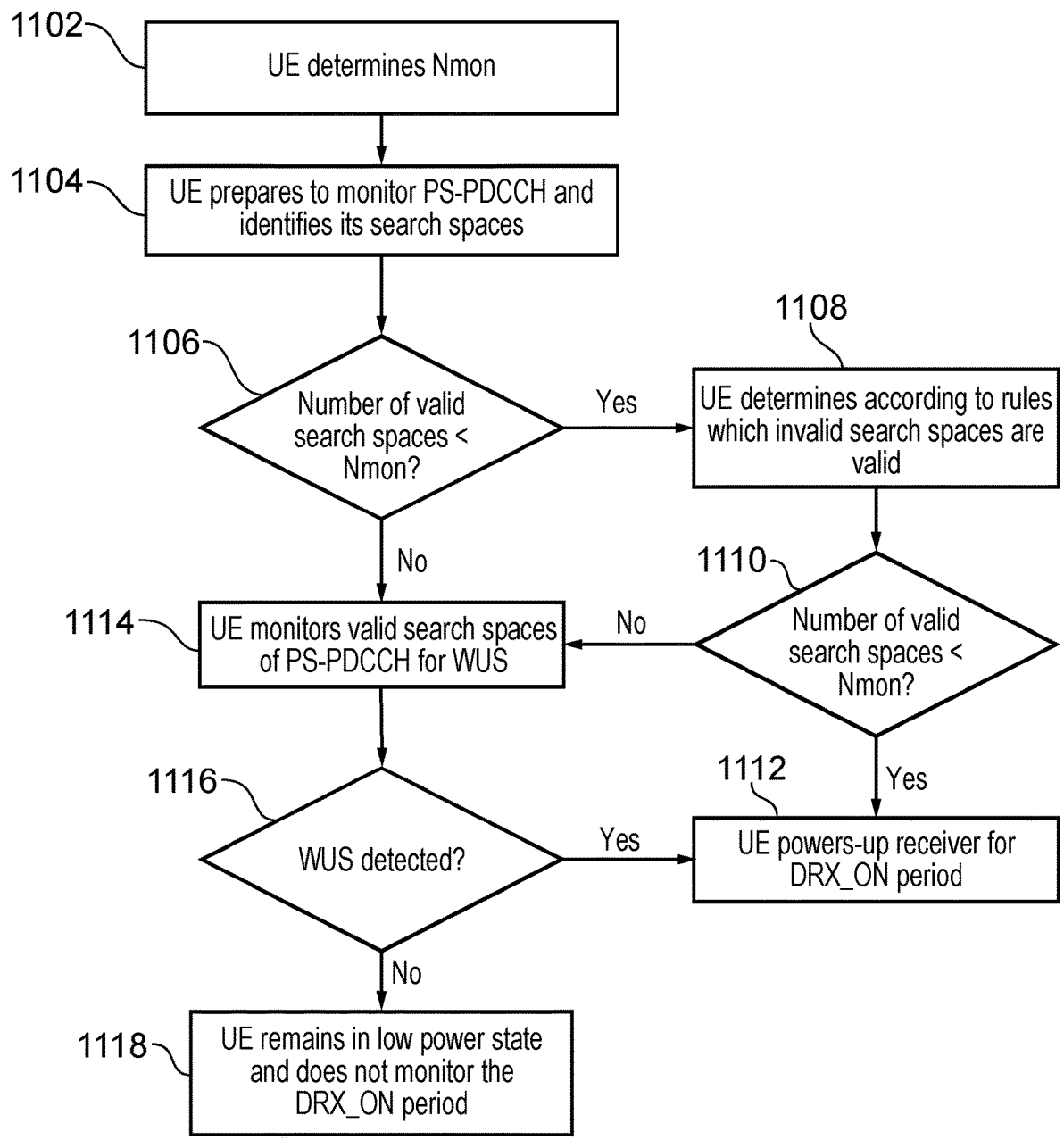
FIG. 11 is a flow diagram illustrating processes performed by a UE according to example embodiments.

FIG. 11 illustrates an example of a processing procedure followed by a UE. The UE 270 determines 1102 the minimum number of valid search spaces $N_{mon}$ (according to any of the methods outlined above). The UE 270 then prepares to monitor a PS-PDCCH monitoring period and identifies 1104 valid search spaces which overlap with the PS-PDCCH monitoring period. In step 1106, the UE 270 determines if a number of valid search spaces is less than $N_{mon}$. If the UE 270 determines that the number of valid search spaces is less than $N_{mon}$ then the UE determines 1108 to validate one or more invalid search spaces according to a set of pre-defined rules. By validating one or more of the invalid search spaces, a refined number of valid search spaces may obtained. In step 1110, the UE 270 determines if the refined number of valid search spaces is less than $N_{mon}$. If the refined number of valid search spaces is less than $N_{mon}$, then the UE 270 wakes up 1112 during a subsequent DRX_ON period. If the refined number of valid search spaces is not less than $N_{mon}$ then processing proceeds to step 1114. Step 1114 can also be reached if the number of valid search spaces is not less than $N_{mon}$. In step 1114, the UE monitors valid search spaces which overlap in time with the PS-PDCCH monitoring period for DCI format 2_6 containing WUS. In step 1116, the UE 270 determines if WUS has been detected in one of the valid search spaces which overlap in time with the PS-PDCCH monitoring period. If WUS has been detected in one of the valid search spaces which overlap in time with the PS-PDCCH monitoring period then the UE wakes up during the subsequent DRX_ON period in step 1118. If WUS has not been detected in one of the valid search spaces which overlap in time with the PS-PDCCH monitoring period then the UE 270 remains in a low power state and does not monitor during the subsequent DRX_ON period.

Figure 12:
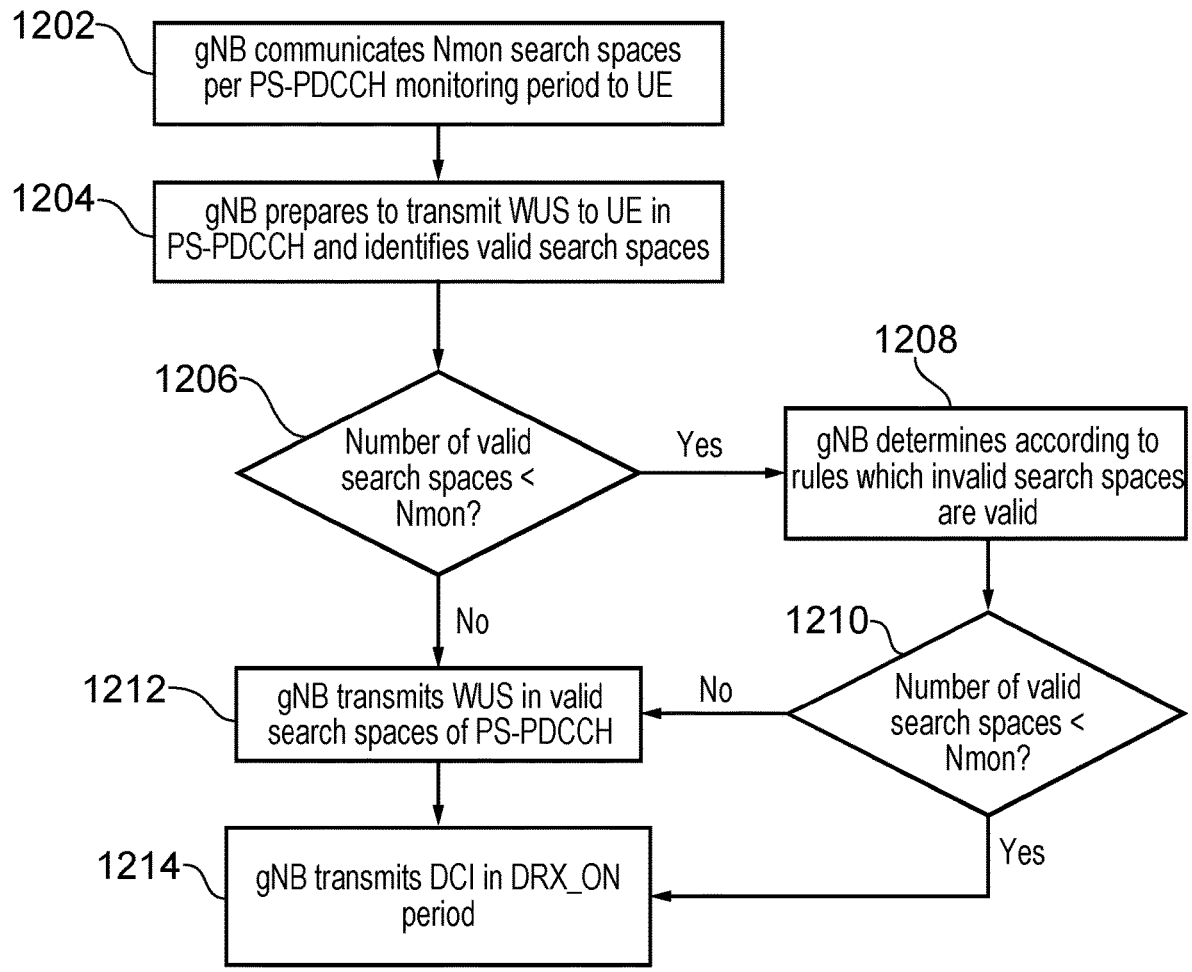
FIG. 12 is a flow diagram illustrating processes performed by a gNB according to example embodiments.

In some embodiments, a gNB may determine to invalidate/validate search spaces. Referring to FIG. 12, the gNB 270 communicates 1202 $N_{mon}$ to a UE (according to any of the methods outlined above). The gNB then 1204 prepares to transmit WUS in DCI format 2_6 to the UE and identifies 1204 valid search spaces which overlap with the PS-PDCCH monitoring period. In step 1206, the gNB determines if a number of valid search spaces is less than $N_{mon}$. If the gNB determines that the number of valid search spaces is less than $N_{mon}$ then the gNB determines 1208 to validate one or more invalid search spaces according to a set of pre-defined rules. By validating one or more of the invalid search spaces, a refined number of valid search spaces may obtained. In step 1210, the gNB determines if the refined number of valid search spaces is less than $N_{mon}$. If the refined number of valid search spaces is less than $N_{mon}$, then the gNB transmits DCI in a subsequent DRX_ON period. If the refined number of valid search spaces is not less than $N_{mon}$ then processing proceeds to step 1212. Step 1212 can also be reached if the number of valid search spaces is not less than $N_{mon}$. In step 1212, the gNB transmits WUS in DCI format 2_6 in valid search spaces which overlap in time with the PS-PDCCH monitoring period.

According to other embodiments, a method of receiving at a communications device may comprise determining a valid number of search spaces from which a wake-up signal, WUS, can be validly received during a power saving monitoring period, the valid number of search spaces being one or more of a plurality of search spaces of a downlink physical control channel of a wireless access interface provided by a wireless communications network for a wake-up signal. The WUS can indicate that the receiver of the communications device should be powered to a higher power state to receive signals in a discontinuous receiving on, DRX_ON, period. In other examples, WUS indicates that the communications device should go to sleep or power down its receiver. The method comprises if the number of valid search spaces is less than a minimum number ($N_{mon}$) of valid search spaces, identifying one or more search spaces which are invalid, identifying whether one or more of a plurality of search spaces on which the WUS will be repeatedly transmitted by the wireless communications network is a valid search space, and monitoring the one or more valid search spaces on which the wireless communications network has indicated that the WUS will be transmitted.

According to this example embodiment a gNodeB may indicate that it will transmit the same WUS on at least $N_{WUS\_SS}$ search spaces. For example, the gNodeB could indicate that it will transmit the same WUS on at least $N_{WUS\_SS}=2$ of the search spaces within a PS-PDCCH monitoring period. In this case, if there are three potentially valid search spaces within a PS-PDCCH monitoring period, the UE may decide to not monitor one of those potentially valid search spaces (in the knowledge that the gNodeB would also transmit WUS in at least one of the other 2 search spaces, ensuring that the UE successfully receives a WUS). This embodiment allows the UE to invalidate some of the search spaces itself, without informing the gNodeB (e.g. in the case that the UE needs to perform beam failure recovery).

The following numbered paragraphs provide further example aspects and features of the present technique:

Paragraph 1. A method of receiving at a communications device, the method comprising
  determining a valid number of search spaces from which a wake-up signal, WUS, can be validly received during a power saving monitoring period, the valid number of search spaces being one or more of a plurality of search spaces of a downlink physical control channel of a wireless access interface provided by a wireless communications network for a wake-up signal to be transmitted, the WUS indicating that the receiver of the communications device should be configured to receive signals in a discontinuous receiving on, DRX_ON, period, and if the number of valid search spaces is less than a minimum number ($N_{mon}$) of valid search spaces,
  identifying one or more search spaces which are invalid, and
  determining that one or more of the invalid search spaces can be regarded as valid, and
  monitoring the valid search spaces, and the search spaces which are regarded as valid for the WUS.

Paragraph 2. A method according to paragraph 1, comprising
  comparing a total number of the number of valid search spaces and the number of invalid search spaces which can be regarded as valid with the minimum number of valid search spaces, and if the total number is less than the minimum number of valid search spaces, controlling the receiver to enter the higher powered state for the DRX_ON period, else
  monitoring each of the valid search spaces and the invalid search spaces which can be regarded as valid for the WUS.

Paragraph 3. A method according to paragraph 1 or 2, comprising
  receiving an indication of the minimum number of valid search spaces from the wireless communications network, the minimum number of valid search spaces being established between the communications device and the wireless communications network.

Paragraph 4. A method according to paragraph 3, wherein the receiving the indication of the minimum number of valid search spaces comprises receiving indication of the minimum number of valid search spaces using radio resource control, RRC, signalling.

Paragraph 5. A method according to paragraph 3, wherein the receiving the indication of the minimum number of valid search spaces comprises
  receiving by the communications device from the wireless communications network a scaling factor, and
  calculating the minimum number of valid search spaces by scaling a total number of search spaces which fall within the power saving monitoring period by the scaling factor.

Paragraph 6. A method according to any of paragraphs 1 to 5, wherein the identifying one or more search spaces which are invalid, includes
  identifying one or more of the search spaces which at least partially overlap with one or more measurement periods during which the receiver cannot validly receive the WUS in the search space because the search space at least partially overlaps with a time when the receiver is configured to measure other signals, and determining that one or more of the one or more search spaces which are invalid because they at least partially overlap with the one or more measurement periods can be regarded as being valid by deferring or not performing the measurements, the one or more search spaces being regarded as valid.

Paragraph 7. A method according to any of paragraphs 1 to 5, wherein the identifying the one or more search spaces which are invalid, includes identifying one or more of the search spaces which at least partially overlap with a period of bandwidth part switching during which the receiver is switching between bandwidth parts and the receiver cannot validly receive the WUS in the search space, and determining that one or more of the one or more search spaces which are invalid can be regarded as being valid by selecting one or more of the invalid search spaces which at least partially overlap with a period of bandwidth part switching.

Paragraph 8. A method according to any of paragraphs 1 to 5, wherein the identifying one or more search spaces which are invalid, includes identifying one or more of the search spaces which at least partially overlap with one or more measurement periods during which the receiver cannot validly receive the WUS in the search space because the search space at least partially overlaps with a time when the receiver is configured to measure other signals, identifying one or more of the search spaces which at least partially overlap with a period of bandwidth part switching during which the receiver is switching between bandwidth parts and the receiver cannot validly receive the WUS in the search space, and determining that one or more of the one or more search spaces which are invalid can be regarded as being valid by selecting one or more of the invalid search spaces which at least partially overlap with the measurement periods to be regarded as search spaces which are valid before selecting one or more of the invalid search spaces which at least partially overlap with the period of bandwidth part switching, until a total number of the number of valid search spaces and the number of invalid search spaces which can be regarded as valid is equal to or greater than the minimum number of search spaces.

Paragraph 9. A method according to any of paragraphs 1 to 5, wherein the identifying one or more search spaces which are invalid, includes identifying one or more of the search spaces which at least partially overlap with a period of bandwidth part switching activated by an expiry of an inactivity timer during which the receiver is switching between bandwidth parts and the receiver cannot validly receive the WUS in the search space, identifying one or more of the search spaces which at least partially overlap with a period of bandwidth part switching commanded by an infrastructure equipment during which the receiver is switching between bandwidth parts and the receiver cannot validly receive the WUS in the search space, and determining that one or more of the one or more search spaces which are invalid can be regarded as being valid by selecting one or more of the invalid search spaces which at least partially overlap with the period of bandwidth part switching activated by the expiry of the inactivity timer to be regarded as search spaces which are valid before selecting one or more of the invalid search spaces which at least partially overlap with the period of bandwidth part switching commanded by the infrastructure equipment, until a total number of the number of valid search spaces and the number of invalid search spaces which can be regarded as valid is equal to or greater than the minimum number of search spaces.

Paragraph 10. A method according to any of paragraphs 1 to 9 comprising comparing a total number of the number of valid search spaces and the number of invalid search spaces which can be regarded as valid with the minimum number of valid search spaces, and if the total number is greater than the minimum number of valid search spaces, selecting one or more of the search spaces which are identified as invalid which are separated in time or frequency by a greater amount from a valid search space than one or more other search spaces which are identified as being invalid and regarding the search spaces separated by a greater amount from a valid search space as being valid, until the total number of the number of valid search spaces and the number of invalid search spaces which can be regarded as valid is equal to the minimum number of valid search spaces.

Paragraph 11. A method according to any of paragraphs 1 to 9, comprising comparing a total number of the number of valid search spaces and the number of invalid search spaces which can be regarded as valid with the minimum number of valid search spaces, and if the total number is greater than the minimum number of valid search spaces, selecting one or more of the search spaces which are identified as invalid which are separated in time or frequency by a lesser amount from a valid search space than one or more other search spaces which are identified as being invalid and regarding the search spaces separated by a lesser amount from a valid search space as being valid, until the total number of the number of valid search spaces and the number of invalid search spaces which can be regarded as being valid is equal to the minimum number of valid search spaces.

Paragraph 12. A method according to any of paragraphs 1 to 9, comprising comparing a total number of the number of valid search spaces and the number of invalid search spaces which can be regarded as valid with the minimum number of valid search spaces, and if the total number is greater than the minimum number of valid search spaces, selecting one or more of the search spaces which are identified as invalid which occur earlier in the power saving monitoring period in preference to one or more other search spaces which are identified as invalid and occur later in the power saving monitoring period and regarding the search spaces which occur earlier in the power saving monitoring period as being valid, until the total number of the number of valid search spaces and the number of invalid search spaces which can be regarded as being valid is equal to the minimum number of valid search spaces.

Paragraph 13. A method according to any of paragraphs 1 to 9, comprising comparing a total number of the number of valid search spaces and the number of invalid search spaces which can be regarded as valid with the minimum number of valid search spaces, and if the total number is greater than the minimum number of valid search spaces, selecting one or more of the search spaces which are identified as invalid which occur later in the power saving monitoring period in preference to one or more other search spaces which are identified as invalid and occur earlier in the power saving monitoring period and regarding the search spaces which occur later in the power saving monitoring period as being valid, until the total number of the number of valid search spaces and the number of invalid search spaces which can be regarded as being valid is equal to the minimum number of valid search spaces.

Paragraph 14. A method according to any of paragraphs 1 to 5, wherein one or more of the plurality of search spaces includes a plurality of candidates, and the identifying one or more search spaces which are invalid comprises identifying one or more of the candidates of the one or more search spaces which are invalid, comparing a total number of the number of valid search spaces and the number of invalid search spaces which can be regarded as valid with the minimum number of valid search spaces, and if the total number is greater than the minimum number of valid search spaces, selecting one or more of the search spaces which are identified as invalid which have a smaller number of candidates which are invalid in preference to one or more other search spaces which are identified as invalid and have a greater number of invalid candidates, until the total number of the number of valid search spaces and the number of invalid search spaces which can be regarded as being valid is equal to the minimum number of valid search spaces.

Paragraph 15. A method according to paragraph 14, wherein a candidate of a search space is regarded as invalid because it at least partially overlaps with a reserved resource or a synchronisation signal block.

Paragraph 16. A method according to any of paragraphs 1 to 15, comprising comparing a total number of the number of valid search spaces and the number of invalid search spaces which can be regarded as valid with the minimum number of valid search spaces, and if the total number is less than the minimum number of valid search spaces, controlling the receiver to enter a state for receiving signals for the DRX_ON period regardless.

Paragraph 17. A method according to any of paragraphs 1 to 15, comprising comparing a total number of the number of valid search spaces and the number of invalid search spaces which can be regarded as valid with the minimum number of valid search spaces, and if the total number is less than the minimum number of valid search spaces, monitoring each of the valid search spaces and the invalid search spaces which can be regarded as valid for the WUS, wherein the WUS can provide an indication that the communications device should enter a low power state for the DRX_ON period, and if the communications device detects the indication that the receiver should enter the low power state for the DRX_ON period, then the receiver enters the low powered state for the DRX_ON period, else the communications device controls the receiver to enter a state for receiving signals during the DRX_ON period.

Paragraph 18. A method according to any of paragraphs paragraph 1 to 15, comprising comparing a total number of the number of valid search spaces and the number of invalid search spaces which can be regarded as valid with the minimum number of valid search spaces, and if the total number is less than the minimum number of valid search spaces monitoring each of the valid search spaces and the invalid search spaces which can be regarded as valid for the WUS.

Paragraph 19. A method according to any of paragraphs 1 to 15, comprising comparing a total number of the number of valid search spaces and the number of invalid search spaces which can be regarded as valid with the minimum number of valid search spaces, and if the total number is larger than the minimum number of valid search spaces monitoring each of the valid search spaces and the invalid search spaces which can be regarded as valid for the WUS.

Paragraph 20. A method of receiving at a communications device, the method comprising determining a valid number of search spaces from which a wake-up signal, WUS, can be validly received during a power saving monitoring period, the valid number of search spaces being one or more of a plurality of search spaces of a downlink physical control channel of a wireless access interface provided by a wireless communications network for a wake-up signal to be transmitted the WUS indicating that the receiver of the communications device should be powered to a higher power state to receive signals in a discontinuous receiving on, DRX_ON, period, and if the number of valid search spaces is less than a minimum number ($N_{mon}$) of valid search spaces, identifying one or more search spaces which are invalid, identifying whether one or more of a plurality of search spaces on which the WUS will be repeatedly transmitted by the wireless communications network is a valid search space, and monitoring the one or more valid search spaces on which the wireless communications network has indicated that the WUS will be transmitted.

Paragraph 21. A communications device for receiving signals from a wireless communications network, the communications device comprising receiver circuitry configured to receive signals transmitted via a wireless access interface provided by the wireless communications network, and controller circuitry configured to determine a valid number of search spaces from which a wake-up signal, WUS, can be validly received during a power saving monitoring period, the valid number of search spaces being one or more of a plurality of search spaces of a downlink physical control channel of a wireless access interface provided by a wireless communications network for a wake-up signal to be transmitted, the WUS indicating that the controller circuitry should configure the receiver circuitry to receive signals in a discontinuous receiving on, DRX_ON, period, and if the number of valid search spaces is less than a minimum number ($N_{mon}$) of valid search spaces, the controller circuitry is configured to identify one or more search spaces which are invalid, and to determine that one or more of the invalid search spaces can be regarded as valid, and to control the receiver circuitry to monitor the valid search spaces, and the search spaces which are regarded as valid for the WUS.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.

[2] RP-172834, "Revised WID on New Radio Access Technology," NTT DOCOMO, RAN #78.

[3] R1-1708311, "Idle Mode Power Efficiency Reduction," Sierra Wireless, RAN1 #89.

[4] TR 38.840, "NR: Study on UE Power Saving (Release 16, v0.1.0)", 3GPP, November 2018". http://www.3gpp.org/ftp//Specs/archive/38_series/38.840/38840-g00.zip

[5] R1-1913605. "RAN1 agreements on UE Power Saving in NR". CATT. RAN1 #99, Reno. November 2019.

What is claimed is:

1. A method of receiving at a communications device, the method comprising determining a valid number of search spaces from which a wake-up signal, WUS, can be validly received during a power saving monitoring period, the valid number of search spaces being one or more of a plurality of search spaces of a downlink physical control channel of a wireless access interface provided by a wireless communications network for a wake-up signal to be transmitted, the WUS indicating that a receiver of the communications device should be configured to receive signals in a discontinuous receiving on, DRX_ON, period, and if the number of valid search spaces is less than a minimum number ($N_{mon}$) of valid search spaces, identifying one or more search spaces which are invalid, and determining that one or more of the invalid search spaces can be regarded as valid, and monitoring the valid search spaces, and the search spaces which are regarded as valid for the WUS.

2. A method according to claim 1, comprising comparing a total number of the number of valid search spaces and the number of invalid search spaces which can be regarded as valid with the minimum number of valid search spaces, and if the total number is less than the minimum number of valid search spaces, controlling the receiver to enter the higher powered state for the DRX_ON period, else monitoring each of the valid search spaces and the invalid search spaces which can be regarded as valid for the WUS.

3. A method according to claim 1, comprising receiving an indication of the minimum number of valid search spaces from the wireless communications network, the minimum number of valid search spaces being established between the communications device and the wireless communications network.

4. A method according to claim 3, wherein the receiving the indication of the minimum number of valid search spaces comprises receiving indication of the minimum number of valid search spaces using radio resource control, RRC, signalling.

5. A method according to claim 3, wherein the receiving the indication of the minimum number of valid search spaces comprises receiving by the communications device from the wireless communications network a scaling factor, and calculating the minimum number of valid search spaces by scaling a total number of search spaces which fall within the power saving monitoring period by the scaling factor.

6. A method according to claim 1, wherein the identifying one or more search spaces which are invalid, includes identifying one or more of the search spaces which at least partially overlap with one or more measurement periods during which the receiver cannot validly receive the WUS in the search space because the search space at least partially overlaps with a time when the receiver is configured to measure other signals, and determining that one or more of the one or more search spaces which are invalid because they at least partially overlap with the one or more measurement periods can be regarded as being valid by deferring or not performing the measurements, the one or more search spaces being regarded as valid.

7. A method according to claim 1, wherein the identifying the one or more search spaces which are invalid, includes identifying one or more of the search spaces which at least partially overlap with a period of bandwidth part switching during which the receiver is switching between bandwidth parts and the receiver cannot validly receive the WUS in the search space, and determining that one or more of the one or more search spaces which are invalid can be regarded as being valid by selecting one or more of the invalid search spaces which at least partially overlap with a period of bandwidth part switching.

8. A method according to claim 1, wherein the identifying one or more search spaces which are invalid, includes identifying one or more of the search spaces which at least partially overlap with one or more measurement periods during which the receiver cannot validly receive the WUS in the search space because the search space at least partially overlaps with a time when the receiver is configured to measure other signals, identifying one or more of the search spaces which at least partially overlap with a period of bandwidth part switching during which the receiver is switching between bandwidth parts and the receiver cannot validly receive the WUS in the search space, and determining that one or more of the one or more search spaces which are invalid can be regarded as being valid by selecting one or more of the invalid search spaces which at least partially overlap with the measurement periods to be regarded as search spaces which are valid before selecting one or more of the invalid search spaces which at least partially overlap with the period of bandwidth part switching, until a total number of the number of valid search spaces and the number of invalid search spaces which can be regarded as valid is equal to or greater than the minimum number of search spaces.

9. A method according to claim 1, wherein the identifying one or more search spaces which are invalid, includes identifying one or more of the search spaces which at least partially overlap with a period of bandwidth part switching activated by an expiry of an inactivity timer during which the receiver is switching between bandwidth parts and the receiver cannot validly receive the WUS in the search space, identifying one or more of the search spaces which at least partially overlap with a period of bandwidth part switching commanded by an infrastructure equipment during which the receiver is switching between bandwidth parts and the receiver cannot validly receive the WUS in the search space, and determining that one or more of the one or more search spaces which are invalid can be regarded as being valid by selecting one or more of the invalid search spaces which at least partially overlap with the period of bandwidth part switching activated by the expiry of the inactivity timer to be regarded as search spaces which are valid before selecting one or more of the invalid search spaces which at least partially overlap with the period of bandwidth part switching commanded by the infrastructure equipment, until a total number of the number of valid search spaces and the number of invalid search spaces which can be regarded as valid is equal to or greater than the minimum number of search spaces.

10. A method according to claim 1 comprising comparing a total number of the number of valid search spaces and the number of invalid search spaces which can be regarded as valid with the minimum number of valid search spaces, and if the total number is greater than the minimum number of valid search spaces, selecting one or more of the search spaces which are identified as invalid which are separated in time or frequency by a greater amount from a valid search space than one or more other search spaces which are identified as being invalid and regarding the search spaces separated by a greater amount from a valid search space as being valid, until the total number of the number of valid search spaces and the number of invalid search spaces which can be regarded as valid is equal to the minimum number of valid search spaces.

11. A method according to claim 1, comprising comparing a total number of the number of valid search spaces and the number of invalid search spaces which can be regarded as valid with the minimum number of valid search spaces, and if the total number is greater than the minimum number of valid search spaces, selecting one or more of the search spaces which are identified as invalid which are separated in time or frequency by a lesser amount from a valid search space than one or more other search spaces which are identified as being invalid and regarding the search spaces separated by a lesser amount from a valid search space as being valid, until the total number of the number of valid search spaces and the number of invalid search spaces which can be regarded as being valid is equal to the minimum number of valid search spaces.

12. A method according to claim 1, comprising comparing a total number of the number of valid search spaces and the number of invalid search spaces which can be regarded as valid with the minimum number of valid search spaces, and if the total number is greater than the minimum number of valid search spaces, selecting one or more of the search spaces which are identified as invalid which occur earlier in the power saving monitoring period in preference to one or more other search spaces which are identified as invalid and occur later in the power saving monitoring period and regarding the search spaces which occur earlier in the power saving monitoring period as being valid, until the total number of the number of valid search spaces and the number of invalid search spaces which can be regarded as being valid is equal to the minimum number of valid search spaces.

13. A method according to claim 1, comprising comparing a total number of the number of valid search spaces and the number of invalid search spaces which can be regarded as valid with the minimum number of valid search spaces, and if the total number is greater than the minimum number of valid search spaces, selecting one or more of the search spaces which are identified as invalid which occur later in the power saving monitoring period in preference to one or more other search spaces which are identified as invalid and occur earlier in the power saving monitoring period and regarding the search spaces which occur later in the power saving monitoring period as being valid, until the total number of the number of valid search spaces and the number of invalid search spaces which can be regarded as being valid is equal to the minimum number of valid search spaces.

14. A method according to claim 1, wherein one or more of the plurality of search spaces includes a plurality of candidates, and the identifying one or more search spaces which are invalid comprises identifying one or more of the candidates of the one or more search spaces which are invalid, comparing a total number of the number of valid search spaces and the number of invalid search spaces which can be regarded as valid with the minimum number of valid search spaces, and if the total number is greater than the minimum number of valid search spaces, selecting one or more of the search spaces which are identified as invalid which have a smaller number of candidates which are invalid in preference to one or more other search spaces which are identified as invalid and have a greater number of invalid candidates, until the total number of the number of valid search spaces and the number of invalid search spaces which can be regarded as being valid is equal to the minimum number of valid search spaces.

15. A method according to claim 14, wherein a candidate of a search space is regarded as invalid because it at least partially overlaps with a reserved resource or a synchronisation signal block.

16. A method according to claim 1, comprising comparing a total number of the number of valid search spaces and the number of invalid search spaces which can be regarded as valid with the minimum number of valid search spaces, and if the total number is less than the minimum number of valid search spaces, controlling the receiver to enter a state for receiving signals for the DRX_ON period regardless.

17. A method according to claim 15, comprising comparing a total number of the number of valid search spaces and the number of invalid search spaces which can be regarded as valid with the minimum number of valid search spaces, and if the total number is less than the minimum number of valid search spaces, monitoring each of the valid search spaces and the invalid search spaces which can be regarded as valid for the WUS, wherein the WUS can provide an indication that the communications device should enter a low power state for the DRX_ON period, and if the communications device detects the indication that the receiver should enter the low power state for the DRX_ON period, then the receiver enters the low powered state for the DRX_ON period, else the communications device controls the receiver to enter a state for receiving signals during the DRX_ON period.

18. A method according to claim 15, comprising comparing a total number of the number of valid search spaces and the number of invalid search spaces which can be regarded as valid with the minimum number of valid search spaces, and if the total number is less than the minimum number of valid search spaces monitoring each of the valid search spaces and the invalid search spaces which can be regarded as valid for the WUS.

19. A method of receiving at a communications device, the method comprising determining a valid number of search spaces from which a wake-up signal, WUS, can be validly received during a power saving monitoring period, the valid number of search spaces being one or more of a plurality of search spaces of a downlink physical control channel of a wireless access interface provided by a wireless communications network for a wake-up signal to be transmitted, the WUS indicating that the receiver of the communications device should be powered to a higher power state to receive signals in a discontinuous receiving on, DRX_ON, period, and if the number of valid search spaces is less than a minimum number ($N_{mon}$) of valid search spaces, identifying one or more search spaces which are invalid, identifying whether one or more of a plurality of search spaces on which the WUS will be repeatedly transmitted by the wireless communications network is a valid search space, and monitoring the one or more valid search spaces on which the wireless communications network has indicated that the WUS will be transmitted.

20. A communications device for receiving signals from a wireless communications network, the communications device comprising receiver circuitry configured to receive signals transmitted via a wireless access interface provided by the wireless communications network, and controller circuitry configured to determine a valid number of search spaces from which a wake-up signal, WUS, can be validly received during a power saving monitoring period, the valid number of search spaces being one or more of a plurality of search spaces of a downlink physical control channel of a wireless access interface provided by a wireless communications network for a wake-up signal to be transmitted, the WUS indicating that the controller circuitry should configure the receiver circuitry to receive signals in a discontinuous receiving on, DRX_ON, period, and if the number of valid search spaces is less than a minimum number ($N_{mon}$) of valid search spaces, the controller circuitry is configured to identify one or more search spaces which are invalid, and to determine that one or more of the invalid search spaces can be regarded as valid, and to control the receiver circuitry to monitor the valid search spaces, and the search spaces which are regarded as valid for the WUS.

* * * * *